US012659852B2

(12) United States Patent

Nanda et al.

(10) Patent No.: US 12,659,852 B2
(45) Date of Patent: Jun. 16, 2026

(54) ENERGY SAVINGS IN CELLULAR NETWORKS

(71) Applicant: Parallel Wireless, Inc., Nashua, NH (US)

(72) Inventors: Nihar Nanda, Acton, MA (US); David Khemelevsky, Kfar Sava (IL); Erez Biton, Herzlia (IL)

(73) Assignee: Parallel Wireless, Inc., Nashua, NH (US)

( * ) Notice: Subject to any disclaimer, the term of this patent is extended or adjusted under 35 U.S.C. 154(b) by 365 days.

(21) Appl. No.: 17/973,125

(22) Filed: Oct. 25, 2022

(65) Prior Publication Data

US 2023/0127116 A1 Apr. 27, 2023

Related U.S. Application Data

(60) Provisional application No. 63/270,758, filed on Oct. 22, 2021.

(51) Int. Cl.
H04W 52/02 (2009.01)
H04W 24/08 (2009.01)
H04W 24/10 (2009.01)

(52) U.S. Cl.
CPC ....... H04W 52/0206 (2013.01); H04W 24/08 (2013.01); H04W 24/10 (2013.01)

(58) Field of Classification Search
CPC .. H04W 52/0206; H04W 24/08; H04W 24/10
USPC .............................................. 455/422.1, 453
See application file for complete search history.

(56) References Cited

U.S. PATENT DOCUMENTS

| | | | |
|---|---|---|---|
| 5,354,957 A | 10/1994 | Robertson | |
| 5,767,461 A * | 6/1998 | Nakagawa | B66B 1/2458 |
| | | | 187/382 |
| 11,334,036 B2 | 5/2022 | Yang et al. | |
| 2014/0092799 A1* | 4/2014 | Jain | H04W 8/08 |
| | | | 370/311 |
| 2015/0087325 A1* | 3/2015 | Nuss | H04W 16/22 |
| | | | 455/453 |
| 2015/0282070 A1* | 10/2015 | Salem | H04W 52/0206 |
| | | | 370/311 |
| 2016/0156440 A1* | 6/2016 | Sergeyev | H04B 7/0626 |
| | | | 370/252 |
| 2018/0160337 A1* | 6/2018 | Gupta | H04W 36/0016 |
| 2019/0243836 A1* | 8/2019 | Nanda | G06F 16/24568 |
| 2019/0319868 A1* | 10/2019 | Svennebring | H04L 41/147 |
| 2021/0141355 A1 | 5/2021 | Duan et al. | |
| 2022/0036387 A1 | 2/2022 | Papadimitriou et al. | |

(Continued)

*Primary Examiner* — Mong-Thuy T Tran
(74) *Attorney, Agent, or Firm* — Michael Y. Saji

(57) ABSTRACT

A method may be disclosed for energy savings in cellular networks, comprising: collecting performance data from the cellular network; sharing the performance data with a batch process to train a prediction model; loading the prediction model into a closed-loop process; using the performance data in combination with the trained prediction model to predict cellular access network load for a particular cell; using the predicted cellular access network load to determine a recommended action; and executing the recommended action. The method may be implemented using a public cloud. The trained prediction model may be used to classify different cells and determine different recommended actions for the different cells.

20 Claims, 4 Drawing Sheets

(56)          References Cited

U.S. PATENT DOCUMENTS

2024/0152820 A1* 5/2024 Singh .................... H04W 24/02
2024/0214834 A1* 6/2024 Masoudi .................. G06N 5/01
2024/0298225 A1* 9/2024 Hyde ............... H04W 36/0083
2024/0422681 A1* 12/2024 Rajendran ......... H04W 52/0235

* cited by examiner

200

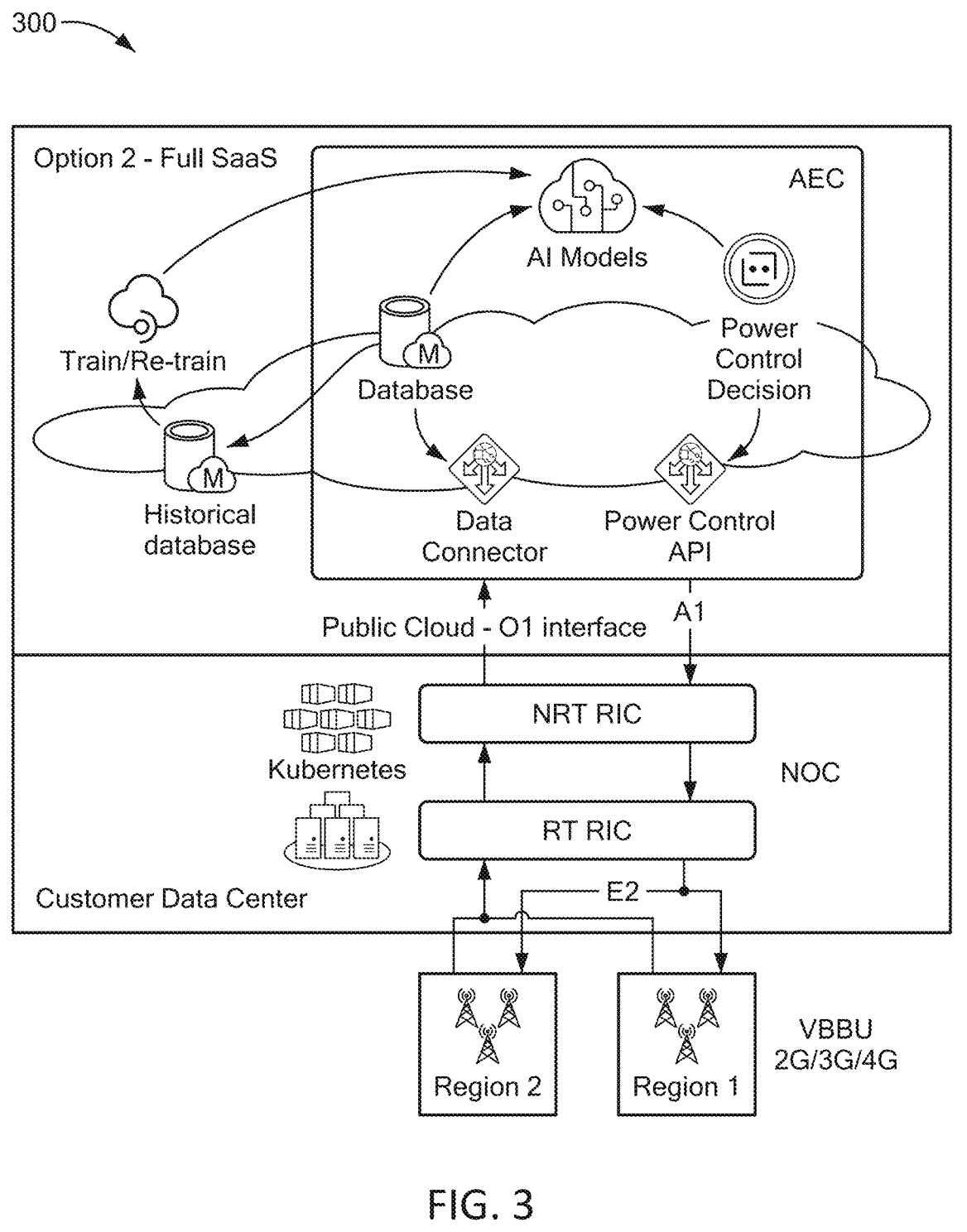

300

Option 2 - Full SaaS

AEC

AI Models

Train/Re-train

Power
Control
Decision

Database

Historical
database

Data
Connector

Power Control
API

Public Cloud - O1 interface          A1

NRT RIC

Kubernetes

NOC

RT RIC

Customer Data Center

E2

Region 2          Region 1          VBBU
2G/3G/4G

FIG. 3

Integration with PW Core network

ENERGY SAVINGS IN CELLULAR NETWORKS

CROSS-REFERENCE TO RELATED APPLICATIONS

The present application claims priority under 35 U.S.C. § 119(e) to U.S. Provisional Pat. App. No. 63/270,758, titled "Energy Savings in Cellular Networks," filed Oct. 22, 2021, which is also hereby incorporated by reference in its entirety for all purposes. As well, the present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and U.S. Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019; and U.S. Pat. App. Pub. No. US20190243836A1, "Data Pipeline for Scalable Analytics and Management."

BACKGROUND

Cellular networks are cyclical. Almost all cells have periods of heavy use when maximum throughout is required and other periods when the cells may not have no or minimal use. The usage patterns are unique to a cell or region. For example, a cell or cells located near an office or a mall complex should have minimum or no use at late night hours when there is no one compared to daytime when workers/shoppers are in the area. Similarly, stadiums or performance experience unprecedented traffic volumes during events but almost no or zero activities at other times. Given the cyclical nature of cell use, operators change cell power levels manually, on a scheduled, or semi-automated to save energy costs during downtimes. 5G only increases the pressure on cellular operators to reduce energy use.

Network cell provides performance measurements periodically indicating operational characteristics such as load, no of users, resource allocations, handovers etc. Typically, these performance counters are reported on a per cell basis every 5-15 mins intervals based on the operation requirements. Performance counters provide an operational view of the cell at any point of time. Looking thru a cell performance over a longer time range, indicates usage of the cell depicting ranges of times when the cell is in highest and lowest use. Traditionally, operators use past data to understand a cell behavior to plan the power cycle planning based on historical usage. But note that smartphones use the network during lean times to update software or back up, and users stream content during lean periods, so a pre-determined power schedule has many disadvantages and is non-responsive to network usage changes, resulting in potentially having to run the cell at full power all day long.

Historical trends are good indicators of usage patterns statistically proven works well over a normal distribution static load pattern. However, predictions based on historical trends don't perform well reacting to spikes or load changes happening sporadically. For example, cells located close to major highways experience load based on regular traffic patterns, or traffic jams caused by unforeseen events such as accidents or even, etc. Historical models used to predict load typically fail to recognize unforeseen change. To avoid such issues, operators set the cells at the highest throughput for longer periods or fall back to alarms notification to take an action after the cell experiences the loading condition.

SUMMARY

A method may be disclosed for energy savings in cellular networks, comprising: collecting performance data from the cellular network; sharing the performance data with a batch process to train a prediction model; loading the prediction model into a closed-loop process; using the performance data in combination with the trained prediction model to predict cellular access network load for a particular cell; using the predicted cellular access network load to determine a recommended action; and executing the recommended action. The method may be implemented using a public cloud. The trained prediction model may be used to classify different cells and determine different recommended actions for the different cells.

BRIEF DESCRIPTION OF THE DRAWINGS

FIG. 3 is a schematic diagram showing a full Software as a Service (SaaS) configuration for deployment, in accordance with some embodiments.

DETAILED DESCRIPTION

Figure 1:
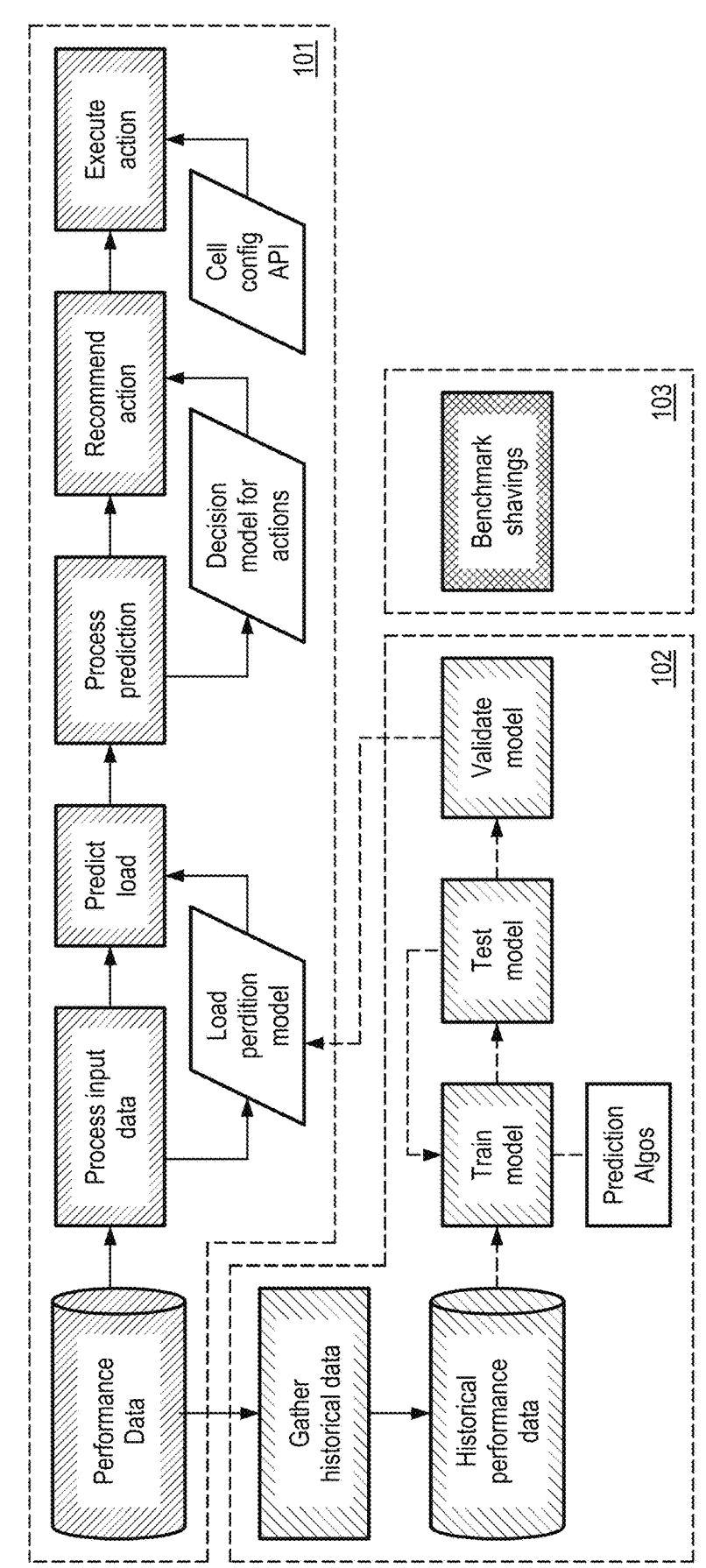
FIG. 1 is a schematic flow diagram showing portions of a closed-loop process, a batch process, and an evaluation process, in accordance with some embodiments.

A significant part of the cellular network operating cost comes from the energy consumption which varies based on data volume, user, and network generation (2/3/4/5G). Studies indicate cost of energy is roughly 8-10% of the operational cost and increasing with deployment of 5G networks. Any energy reduction without impacting the base SLA should be great for the operators curbing out operational expenses.

ORAN architecture promotes cells to be deployed in containers workloads giving the flexibility to run any (2/3/4/5G) radio as needed. Orchestration and control software provided by vendors can bring a cell automatically, configure as needed and use without any manual interference.

Surveys indicates that 5G cells consume significantly more energy upwards of 30% compared to the previous generation radios. It is disadvantageous for operators to increase energy cost significantly without the option of increasing revenue in a similar range. Managing the energy consumption of a cell become a pressing function to preserve for the operational margin.

Next few years, the cellular network will not just use by handheld user devices but shared with IoT devices (self-driving cars, real-time-traffic) causing a change in the network usage pattern. Historical patterns used in perdition of energy usage patterns will no longer be applicable because network down times will be different.

Prediction of energy consumption into the future will be critical element for the automated operational system to react. Adjusting cell energy demands in smaller time intervals operators can match desired power consumption close to what is optimal for the cell.

In one embodiment a method for energy savings in cellular networks includes: collecting performance data of cellular network; processing the performance data to determine processed performance data; predicting load from the processed performance data; performing process prediction from load prediction; recommending action based on process prediction; and executing the action.

DETAILED DESCRIPTION

Predicting energy saving solution is architected into three functional categories: (1) Predictive models, (2) Close-loop operation, and (3) Benchmarking. Combination of all 3 processes enables solution demonstrating the value of end-to-end the capability saving energy in a live network. The functional categories described here also determines how the process should be developed with a system level thinking in controlling and managing networks to achieve certain level of efficiency and operational maturity. It is also indicative of the fact that as the capabilities are developed in stages, use case can be realized with milestones from beginning to end.

Predictive models. As the energy savings use case is decomposed, heart of the capability is to create a process framework where predictive models can be developed, trained, evaluated, and validated repetitively to forecast load parameters both at cell and regional levels. This process is centered around data science work to identify and validate model or sets of models that can be useful for prediction. The process can start using supervised model development/validation with maturity moves to unsupervised model development/validation enabling fully automated state.

The energy saving use case is only realized if predictive models can be developed-trained-validated with reasonable operational characteristics and prediction accuracy, a step towards monetization.

Closed-loop operation A framework that enables the use of trained models in production process making recommendations achieving energy-savings goals in the network. The trained model used in a production environment forecasts the load parameters for cells in advance (time t+n where t is the current time) which leads to a decision-making process determining the foreseeable recommended action. Over time, the system improves ability to recommend decisions when configuration APIs can be used to act automatically on recommended decision.

For example, the system predicts that the between 8:30 AM-9:30 AM there will be minimal or no load on cell A so the cell can be taken off-line. During this time, a neighboring cell B as designed can pick up the traffic. Say, the model recommended such decisions several times turns out in 95% of cases Cell A can be turned off. With this level of operational maturity, the recommendation can be automated using cell configuration APIs.

Benchmarking: A nice-to-have process that can measure the value of energy saving system by qualifying reduction in the energy per cell or per region based on before and after. The process of benchmarking enables measurable KPIs that indicates the close-loop energy savings is effective. Think of as a performance measurement system that can be used to create operational policies and means to achieve them.

Model training and optimization system: For the closed-loop prediction system operating accurately while keeping forecasting at par with seasonal load adjustments, a set of batch process required in parallel to refresh prediction models on a as needed basis. The batch process should collect and store performance data stores in historical repositories, trains/test/validates the models, if approved, refreshes the models periodically. This is an offline process that runs using a separate set of resources so that it does not impact the performance of the close-loop energy saving models.

The model building and refreshment process is as follows, in some embodiments. Gather historical data: A process that collects performance data reported from the cells periodically writes to a historical database collecting to train the models. Historical performance data: A database containing the performance data for all the cells collected periodically. This database is historical can grow with time. Train model: It is a generic process that trains load prediction models per cell. The process collects the historical data from the database, formats based on the model criteria, runs the model training algorithms to create/update the model parameters. The data scientist may use a candidate set of available models to train using the data from the database applicable to the load prediction. Test model: Model testing is a generic process to benchmark the load predicting models against known label data sets to determine prediction accuracies. Based on the results obtain from various trained model, hyperparameters can be tuned repeating model training and testing process. Validate model: Final step in the process that certifies that load testing model has the desired level of accuracy to be used in the energy saving prediction process. Once the prediction model reaches the level of accuracy and timely perdition thresholds the process releases new load prediction models to the close-loop energy saving prediction model.

Closed-Loop Energy Saving System:

To control cell power level closely, the system requires a prediction engine capable of forecasting load and users with some degree of accuracy ahead of time, e.g., time t=n. Knowing the forecasted load, an automated control system should choose best action from set of available options to control power for the cell or cells in a better way. FIG. 1 depicts a process flow for such an action in the closed-loop flowchart 101, e.g., Continuous load prediction process with predicted action.

Performance data: Raw performance counter data gathered from cells in a network periodic basis collected in a database. Process input data: Process that reads the performance data from the database, converts to the input format as desired by model for the purposes of the prediction model. Predict load: Process that executes the previously trained load prediction model to receive the load forecast for time t=n. Process prediction: Process that converts the model predictions into forecast load that can be interpreted.

The process should forecast at individual cell level or at a group of cells with similar operational behavior. For example, all the base stations serving a stadium can be grouped together confirming to an energy saving action. Recommend action: A heuristic process which input the model predictions to project most likely power action the system should for the purpose of optimal power control in a cell or cells in a region. Execute action: Based on the recommended action for a cell or a group of cells, this process uses the cell config API to adjust the power levels for the cell. Load prediction model: A collection of models per cell previously trained to forecast load parameters for time t+n with an accuracy level. The model takes input in a specified data format producing the outputs. The model prediction should be within an appropriate time slot. Decision model for actions: A heuristic model pre-calibrated to generate a power control recommended action for a specific predicted load condition. The complexity of this model ranges from simple if-then-else statement to sophisticated machine learning decision trees.

Cell Config APIs

It is collection of REST or equivalent set of APIs applicable to PW or any 3$^{rd}$ party vendor cells that can be used to configure cell power actions. The idea is to call the cell configuration APIs based on the power adjustment recommended action predicted by the model.

Solution Development, A Step-By-Step Approach

To develop a solution for energy saving, it is essential to forecast cell load parameters. A load on a cell is defined as no of users, data volumes or volume per user etc. All these load indication parameters are reported by every cell periodically as counter value and stored in the databases. Essentially, the input data set is timeseries, a predictive model should forecast the parameter values parameters as future time steps.

The predictive model is of type timeseries forecasting, in some embodiments, where the algorithm leans from the past trends to project into the future. It is a highly studied area because of financial markets, supply and demand forecasting, weather forecasting, health care, etc. Most of these problems are timeseries based, and the approaches largely depend on the datasets. Therefore, there is no recommended approach in the field.

Research Literature

Time series forecasting algorithms are being used for many years to predict the future behaviors based on historical data. Many industries such as retail, industrial engineering, manufacturing, financial use successfully in managing the operations for many years. The algorithms use statistical to probabilistic approaches for prediction of parameters. The techniques include simple linear regression, polynomial regression, random forest analysis, etc. to forecast statistical. Most of these statistical methods requires large volumes of historical data with accuracy degradation with missing inputs. Anomalies in input parameters have an adverse impact on the statistical algorithms and their ability to predict. However, the statistical approaches are simple, proven, and easy to program once the data is available; are in use in many applications. It is an option to use statistical algorithms to begin prediction of cell failures in the network.

Machine learning algorithms in recent years have been gaining momentum in predicting failures. Most of these algorithms deploy unsupervised learning model using Reinforced Neural Network (RNN) techniques, which gets better over time as the model used more and more. Many of these models are capable of handling anomalies, missing input data and data reports in time intervals as exists in the time series data sets. Data requirements for these algorithms are not high to achieve a comparable level of prediction. As time goes, with data these models learn and get better at predictions. Some of the modern RNN variants use complex neural networks embedded with learning memory to predict accurately. Some of these RNN-based forecasting algorithms are DRNN, LSTM, GRU. Building and training of these algorithms are more complex, requires data transformation, feature extraction and labeling of data before the models can be trained. Special trained engineers in AI/ML are used to make these models operational. However, once set up prediction accuracy from these algorithms in real production environments with imperfect data far out ways the complexity of the set up.

Building Models to Predict Cell Parameters:

In this experiment, we started with RNN models, specifically LSTM, GRU and LSTM sequential to predict no of users and data volumes in a cell. The objective of model are: Forecast cell measurement parameters for next time period; Model training cycles should be reasonable with minimum loss; and Model predictions can be executed. Different models and techniques can be used, in some embodiments, such as LSTM experimental results and observations; GRU experimental results and observations; LSTM sequential experimental results and observations may be used, in some embodiments.

Decisions model for action. Based on predictions from the model, decisions must be taken as a proactive step to enable energy savings. Decisions expressed as rules is captured in this section. For example, if a cell predicts to have no traffic and no users for next 2 hours then the cell can be powered down. Something similar to this that enables the actions leading towards power savings.

Based on model prediction of cell activity. The action should be to grow or shrink the cell energy saving time slots. To understand the following it is noted that a stacked/layered cell layout is used in marketplaces, event centers, office complexes, etc. wherein a coverage layer provides large distance but limited bandwidth coverage, for sparsely distributed user devices in coverage areas; with capacity layer cells providing additional throughput, bandwidth, user count, but with smaller coverage area. The capacity layer cells are typically cyclical and peak hour usage for these cells uses more power.

Shrink: period, of at least 2 hours consecutive time window that cell activity capacity and coverage layer estimated close to none. Consideration for coverage and capacity layer should be done based EARFCN, where the lowest frequency shall by default considered the coverage layer.

Step 1: staring energy saving. The decision should be to reduce the by default 3 dBm reducing the current define value in the capacity cells.

| Parameter ID | Mode | Sub Mode | Parameter Name | Parameter Description |
|---|---|---|---|---|
| max-ref-signal-power | profiles | self-organization enb-transmit- | Maximum Reference | Maximum reference signal power the eNB is allowed to transmit. |

-continued

| Parameter ID | Mode | Sub Mode | Parameter Name | Parameter Description |
|---|---|---|---|---|
| min-ref-signal-power | profiles | power-control self-organization enb-transmit-power-control | Signal Power Minimum Reference Signal Power | Specifies the minimum reference signal power (in dBm) eNB is allowed to transmit. |
| ref-signal-power | profiles | self-organization enb-transmit-power-control | Reference Signal Power | The reference signal power of CWS (in dBm) when no neighbors are detected or Tx power algorithm is disabled. |

Step 2: ES QoS Evaluation at least one hour post ES start condition. The evaluation shall be no congestion, admission control the following counters shall be evaluated that not increased more than normal STD. The comparison shall be done within capacity and coverage layer cells.

Step 2: ES QOS evaluation at least one hour post ES start condition. The evaluation shall be no congestion, admission control the following counters shall be evaluated that not increased more than normal STD. The comparison shall be done within capacity and coverage layer cells.

```
Cgst.AvgGbrPrb
Cgst.LteBkhlBw
Cgst.MmeOvldInd
Cgst.CpuLoadCritical
Cgst.CpuLoadMajor
Cgst.CpuLoadMinor
Cgst.HighUeNum
```

```
ERAB.EstabAddFailNbr.Adm.Cgst.AvgGbrPrb.Sum
ERAB.EstabAddFailNbr.Adm.Cgst.LteBkhlBw.Sum
ERAB.EstabFailNbr.HoAdm.Cgst.AvgGbrPrb.Sum
ERAB.EstabFailNbr.HoAdm.Cgst.LteBkhlBw.Sum
```

```
ERAB.EstabAddAttNbr.QCI.Sum
ERAB.EstabAddSuccNbr.QCI.Sum
```

For case no degradation observed move to next step. Otherwise, rollback the decision and stop ES on this time window.

Step 3: Disable Capacity Cells.

For case that ES state reached this phase, ES shall decide to disable the capacity cell.

| Parameter ID | Mode | Sub Mode | Parameter Name | Parameter Description |
|---|---|---|---|---|
| admin-state | accessnodes | cws lte cell | LTE Cell Network Admin State | Allows administrator to enable or disable the LTE radio. |

Step 4: Health Monitoring

Periodically for each 15 min-30 min ES shall reevaluate the counters from step 2 (only coverage layer) and decide if capacity layers are likely to be required sooner from the anticipated or if it is end of the ES time window.

Grow: these criteria evaluating when and how many capacity cells shall be remained to support the traffic demand. It feeds from predicated traffic patterns based on ML as well actual decisions from ES, cases that ES stopped in middle of process due to KPI degradation.

The purpose of this step is to avoid ES even starting on time windows where it is likely to rollback the decision or already known that poor performing As for example initial estimation for ES might be 21:00-06:00. System tracked that ES stopped at 23:30 and 05:00 from historical actions.

Hence the evaluation shall be for next ES activation of 21:00-23:00 and 00:00-05:00

Example below illustrating the ES behavior in network with multiple frequency carriers.

Recommendation. Based on the decision the system proposes, a recommendation is generated shown in a screen to an end user(s) what action is meaningful to take for the cell to achieve the energy savings goals.

FIG. 1 is a schematic flow diagram showing portions of a closed-loop process, a batch process, and an evaluation process, in accordance with some embodiments. Closed-loop process 101 includes various steps as shown. In summary, the closed-loop process obtains performance data for the cell, processes the input data, loads a prediction model that is used to predict future load, processes the prediction using a decision model for actions to generate a recommended action, and then executes the action, including via a cell configuration API. The closed-loop process may take place within the cellular network, including at a RAN, a near-RT RIC or real-time RIC. The closed-loop process may take place rapidly, including as an asynchronous process that is running while the RAN continues to provide service to users, and including on a timescale of real time, near-real time, or another timescale, as appropriate, in some embodiments.

A first step of the closed-loop process, obtaining or storing performance data, also feeds information to a batch process 102, which includes other steps as shown. In summary, in accordance with some embodiments, the batch process takes place at a slower pace than the closed-loop process and may take place daily, nightly, weekly, monthly, etc. The batch process may be performed on the same or different network nodes from the closed-loop process. The batch process may take place using a different containerized processing system than the closed-loop process. The steps of the batch process use the data gathered by the closed-loop process and then use that data to train models. The historical data is gathered;

the historical performance data is aggregated; the aggregated data is used to train one or more models and, when the models are trained, to determine whether the model are able to adequately predict the input data, and, the models are validated. Prediction algorithms may be introduced or added, or, algorithms could be determined solely on the basis of the data. Artificial Intelligence (AI)/Machine learning (ML) techniques known in the art can be used to train and test the models. Once these AI/ML models are adequately tested, they can be fed back into the closed-loop process to enable improved fidelity in the load prediction step.

A third portion of the flowchart, benchmarking 103, allows for time savings, CPU savings, resource savings, KPI savings etc. to be tracked and tallied, in some embodiments. This allows the network operator to evaluate the models, and also allows the models themselves to be better trained and to better train themselves. The benchmark results could be fed back into the batch process or the closed-loop process, in some embodiments.

Figure 2:
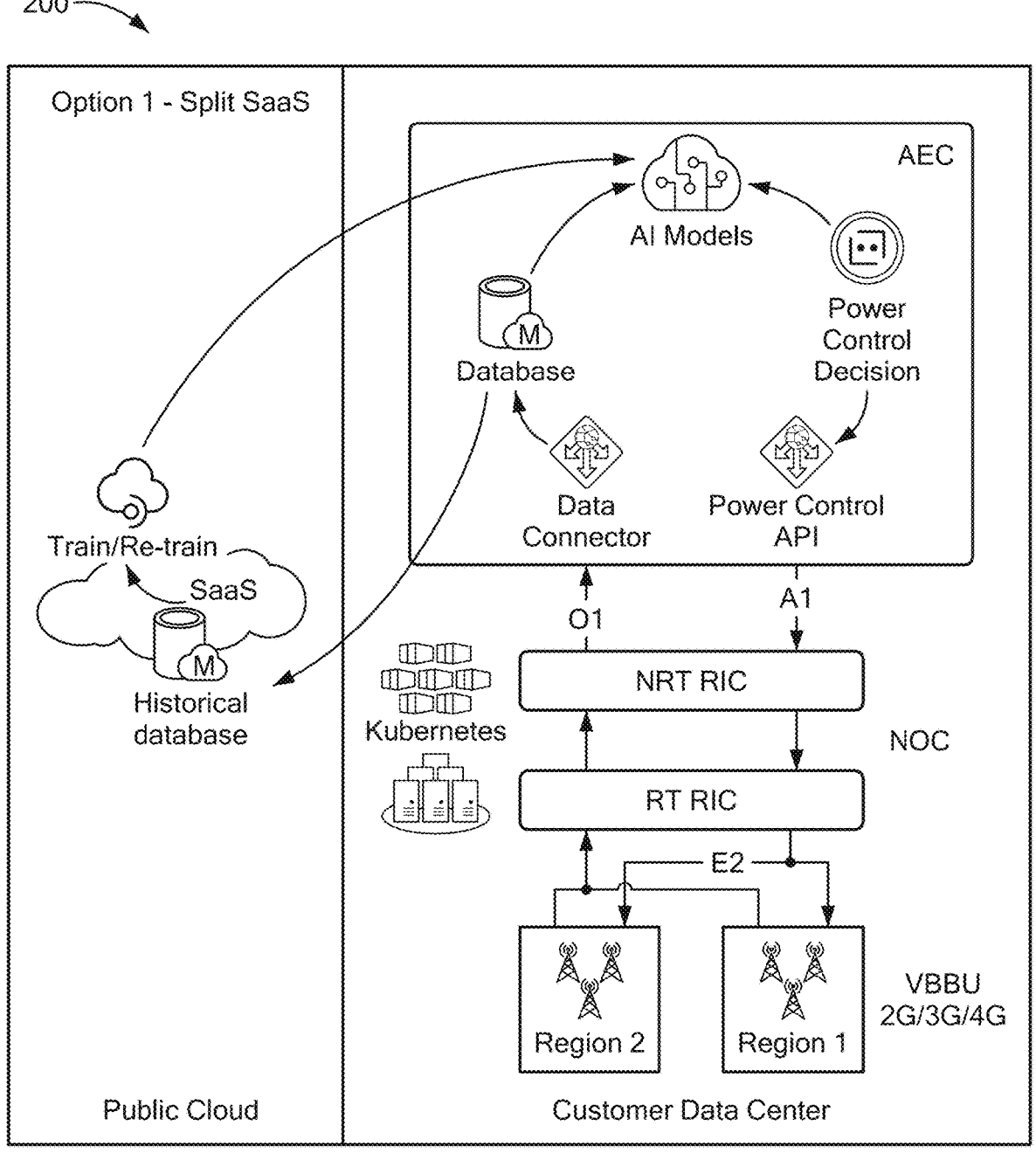
FIG. 2 is a schematic diagram showing a split Software as a Service (SaaS) configuration for deployment, in accordance with some embodiments.

FIG. 2 is a schematic diagram showing a split Software as a Service (SaaS) configuration 200 for deployment, in accordance with some embodiments. In FIG. 2, a configuration is shown where a network operations center (NOC) hosts a near-real time MC and a real-time MC, using a cluster of nodes and/or Kubernetes or other types of containerized cloud architecture. The NOC is connected to the RAN, which may be a virtual baseband unit (VBBU) based system for 2G, 3G, 4G, or (not shown) 5G. Two regions are shown but other numbers of regions may be supported and other radio access technologies (RATs) may be supported as well. The O1 and A1 interfaces are used for connecting to the AEC (Active Energy Control) layer. The AEC includes the AI models, database, data connector, and power control API, in some embodiments. Data connector includes a preprocessor for data streams, model input transformations, providing connection credentials, etc. The database provides current, historical data, model parameters, and operational data. The training module provides algorithm selection, model training, and qualification. The trained models provide forecasting, classification, action qualification, and per-device or per-network actions. The power control decision module translates policies into specific optimizations and actions. There is an action API that enables these actions to be taken and also provide some additional benefits such as an audit trail. Various inputs can be provided into the system such as prediction classification algorithms, preprocessing routines, power control rules and policies, database schemas, as needed. The models may use recurrent neural networks (RNNs), in some embodiments. A long short-term memory (LSTM) or gated recurrent unit (GRU) algorithm could be used, in some embodiments.

The VBBU, the NOC, and the AEC are in the customer data center. As customer-derived data and power control over the operator RAN is sensitive, it is sited in the customer data center. The AEC is communicatively coupled, in some embodiments, to the historical database and train/retrain module, and these items are able to be offloaded to the public cloud as model training is not latency-bound, in most cases. This option allows the network operator to retain control of certain components in a self-hosted cloud.

In some embodiments the following features are enabled by the AEC. KPI prediction—Select any KPIs to detect anomaly detection or limit prediction; Busy hour KPI both actual and prediction—Customers measure peak network performance calculating KPIs during busy hour; Prediction of true maintenance window for a cell minimizing impact—

Forecasting lean periods per cell—a window with minimum customer QoE impact, using lean window to perform maintenance if possible, and automated maintenance such as, software upgrade and patching of cell; Option to switch from LTE to 2G during lean hours, saving energy and bandwidth—Lit low-energy 2G cells during lean periods meeting minimum requirements; Backhaul throughput demand prediction by region—Throughput prediction by region achieved from grouping individual cell forecasts. Networks operating in expensive backhaul may have ability to plan; Backhaul throughput demand daily planning—Knowing throughput ahead of time, operators can plan admin activities such as staging upgrade bundles, downloading logs or data, etc. without impacting user QoE. Examples of power control rules include: Shrink capacity cell Tx power by 3 dBm (ref-signal-power); Disable capacity cells at lowest traffic volume; EARFCN lower means coverage cell; or other Custom rules given by customers.

Objective: Reduce/stop power for cells running with minimal or no traffic in next time period; Predict cells that would have no or minimal traffic; Prepare power control action plan for low or no traffic cells; and Execute/recommend power control action for cell/s.

In some embodiments the algorithm used could be as follows: For each time step repeat: Receive cell performance data; Forecast traffic for each cell; Classify cells based on traffic forecast; Decide power control action for low/no traffic cells; Provide power control recommendations for next time step; Execute power control recommendation in live network for next time step.

Prediction models could include: Forecast parameters in-advance (next 4 hours); Operational parameters Volume/Traffic/User/Resource/Call drop/CPU usage, etc.; Predict per cell basis and cumulative over a region; Detect sleeping cell condition (Determine, if a cell is in sleeping condition; Predict, if a cell might enter sleeping cell); Detect anomalies, such as Detecting operational parameter anomalies per cell and per region, or Anomalies for extended parameters which impacts cell performance; Predict failure, e.g., Probability of a cell failing in next 4 hours. Classification Models could identify Clusters based on location and mobility or could distinguish Capacity and coverage cells.

FIG. 3 is a schematic diagram showing a full Software as a Service (SaaS) configuration 300 for deployment, in accordance with some embodiments. Although similar to FIG. 2, the components that are further from the RAN and beyond the NOC are fully migrated to the public cloud.

Figure 4:
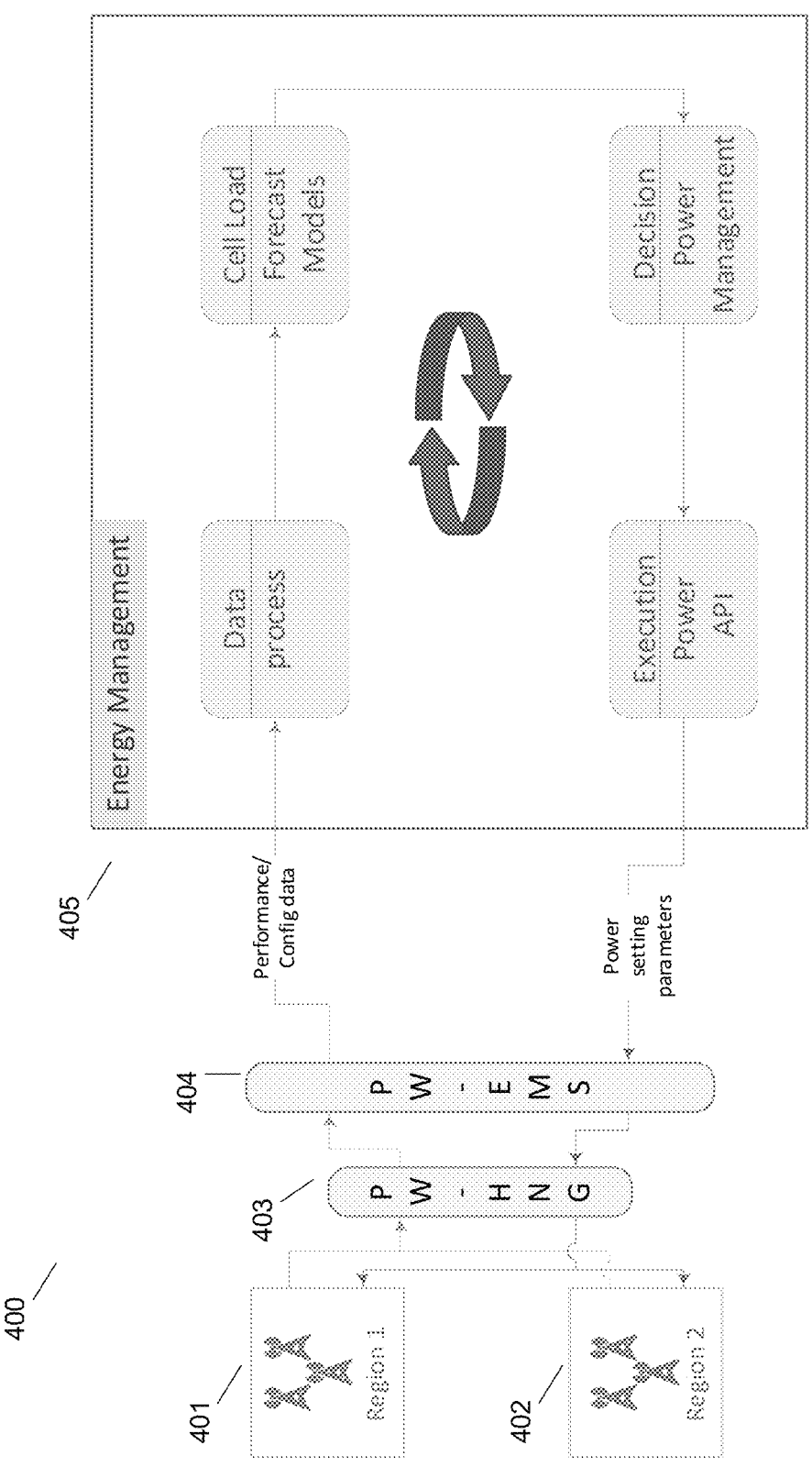
FIG. 4 is a schematic diagram showing integration with a core network, in accordance with some embodiments.

FIG. 4 is a schematic diagram showing integration with a core network, in accordance with some embodiments. A schematic network is shown, with RAN 401 in region 1, RAN 402 in region 2, a Parallel Wireless HetNet Gateway 403 in communication with the RAN nodes (which may also be any other core network, in accordance with some embodiments, including a 2G, 3G, 4G, 5G NSA, 5G SA, or other core network); an element management system (EMS) 404 connected to core 403, and an AI/ML pipeline 405 that is coupled to the element management system. The AI/ML pipeline 405 receives performance/configuration data, performs processing on the data, uses cell load forecasting models to make a decision regarding power management, and executes the relevant instructions using a power control API to modify power setting parameters at the EMS 404, which sends instructions via core 403 back through to RAN nodes 401 or 402. AI/ML for energy management is shown but this may be run on the same or similar hardware or data center (public or private cloud, etc.) that is used for other AI/ML infrastructure.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

In any of the scenarios described herein, where processing may be performed at the cell, the processing may also be performed in coordination with a private cloud, public cloud, colocated cloud, or other cloud server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as a RIC or near-RT RIC, In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for energy savings in cellular networks, comprising:
   collecting performance data from a cellular network;
   sharing the performance data with a batch process to train a prediction model;
   loading the prediction model into a closed-loop process;
   using the performance data in combination with the trained prediction model to predict cellular access network load for a particular cell;
   training a decision model to generate a power control recommended action for a specific predicted load condition;
   determining, using the decision model and using the predicted cellular access network load, a recommended action; and
   executing the recommended action using an application program interface (API) to send instructions to the particular cell.

2. The method of claim 1, wherein model training is performed using a public cloud, and wherein determining using the decision model is performed either using a public cloud or in a cellular operator network.

3. The method of claim 1, wherein the trained prediction model is used to classify different cells and determine different recommended actions for the different cells.

4. The method of claim 1, further comprising benchmarking by quantifying a value of an energy saving system into a reduction in energy per cell or per region.

5. The method of claim 1, wherein the benchmarking is based on comparing before and after energy usage.

6. The method of claim 1, using a load prediction model to predict load parameters for a time t+n.

7. The method of claim 1, wherein the prediction model uses a recurrent neural network (RNN).

8. The method of claim 1, wherein the prediction model uses one or more of DRNN (deep recurrent neural network), LSTM (long short-term memory), GRU (gated recurrent unit) models.

9. The method of claim 1, further comprising, by the decision model, a decision to grow or shrink cell energy saving time slots for capacity layer cells in a layered cell deployment architecture.

10. The method of claim 1, further comprising, by the decision model, a decision to increase or decrease signal power for capacity layer cells in a layered cell deployment architecture.

11. A non-transitory computer-readable medium comprising instructions which, when executed in a network architecture at a processor, cause the network architecture to perform steps further comprising:
   collecting performance data from a cellular network;
   sharing the performance data with a batch process to train a prediction model;
   loading the prediction model into a closed-loop process;
   using the performance data in combination with the trained prediction model to predict cellular access network load for a particular cell;
   training a decision model to generate a power control recommended action for a specific predicted load condition;
   determining, using the decision model and using the predicted cellular access network load, a recommended action; and
   executing the recommended action using an application program interface (API) to send instructions to the particular cell.

12. The non-transitory computer-readable medium of claim 11, wherein model training is performed using a public cloud, and wherein determining using the decision model is performed either using a public cloud or in a cellular operator network.

13. The non-transitory computer-readable medium of claim 11, wherein the trained prediction model is used to classify different cells and determine different recommended actions for the different cells.

14. The non-transitory computer-readable medium of claim 11, further comprising benchmarking by quantifying a value of an energy saving system into a reduction in energy per cell or per region.

15. The non-transitory computer-readable medium of claim 11, wherein the benchmarking is based on comparing before and after energy usage.

16. The non-transitory computer-readable medium of claim 11, using a load prediction model to predict load parameters for a time t+n.

17. The non-transitory computer-readable medium of claim 11, wherein the prediction model uses a recurrent neural network (RNN).

18. The non-transitory computer-readable medium of claim 11, wherein the prediction model uses one or more of DRNN (deep recurrent neural network), LSTM (long short-term memory), GRU (gated recurrent unit) models.

19. The non-transitory computer-readable medium of claim 11, further comprising, by the decision model, a decision to grow or shrink cell energy saving time slots for capacity layer cells in a layered cell deployment architecture.

20. The non-transitory computer-readable medium of claim 11, further comprising, by the decision model, a decision to increase or decrease signal power for capacity layer cells in a layered cell deployment architecture.

* * * * *